INVENTOR.
LUTHER E. JUSTIS

April 22, 1969     L. E. JUSTIS     3,440,432
MISSING BOTTLE DETECTOR

Filed Sept. 17, 1965     Sheet 2 of 2

INVENTOR.
LUTHER E. JUSTIS
BY
Oldham & Oldham
ATTORNEYS ns
3,440,432
MISSING BOTTLE DETECTOR
Luther E. Justis, Ellicott City, Md., assignor to Carling
 Brewing Company Incorporated, Cleveland, Ohio, a
 corporation of Virginia
Filed Sept. 17, 1965, Ser. No. 488,143
Int. Cl. H01j 39/12; G06m 5/10
U.S. Cl. 250—223                                    6 Claims

ABSTRACT OF THE DISCLOSURE

Apparatus for detecting a missing capped bottle or a missing bottle cap in a longitudinally extending row of bottles in a carrier case is disclosed. Photoelectric means are used to sense the presence of cases moved along a fixed path and sensor heads and associated electrical control means are connected to the photoelectric means whereby when a sensor head detects a missing bottle or bottle cap, the main drive circuit for moving the cases in the fixed path can be interrupted.

---

The present invention particularly relates to apparatus for inspecting cases presumably filled with capped glass containers as such cases are moved along through a fixed path. More specifically, the present invention relates to apparatus and associated electric means for use in detecting any missing caps, or missing capped bottles in presumably filled cases as they are moved along through a fixed path and for terminating such movement when and if a missing cap or container is observed by the apparatus.

In commercial practices of today, many soft drinks, beer and other beverages are sold in glass or other non-metallic containers having metal caps thereon. These containers, such as bottles, normally are processed in large quantities by the company producing the soft drink, beer, or other beverage, and the bottles normally are grouped into or placed into cases that, for example in many instances, carry 24 of the bottles and are used for transportation, storage and shipment of the filled containers to the point of sale. However, because of the automatic machinery that is widely used for filling the bottles, and other machinery used for filling cases with the filled bottles, in some instances a bottle may not be properly capped, or the case may not be completely filled with bottles. Obviously, such missing caps and/or bottles cause appreciable confusion in the trade and complaints from purchasers of the cases whereby it is frequently necessary to inspect the cases visually prior to shipping them from the point of manufacture or use out to the retailer for sale of the filled cases.

The general object of the preesent invention is to provide novel and improved means for detecting any missing bottles rapidly in cases as they are moved by a conveyor or other means through a fixed path.

Another object of the invention is to provide electrical control means in a bottle processing plant for detecting missing bottles in filled cases as they are moved through a fixed path and for terminating movement of the cases through the fixed path when any missing bottle is noted by the apparatus, and to effect such actions automatically and rapidly.

Further objects of the invention are to combine known electrical components in a novel manner whereby means are provided for individually inspecting the bottles in one or more longitudinally extending rows as they are moved by a fixed path to detect any bottles not in predetermined abutted or other longitudinally spaced relationship with the adjacent bottles; to provide apparatus that can be easily associated with presently installed processing machines used in handling cases filled with bottled beverages for checking the presence of the required number of bottles in the presumably filled cases; to provide apparatus that will function rapidly without any interference of movement of filled cases through a processing plant to verify that all of the cases being released by the plant are filled with capped bottles; to provide apparatus that will function with a minimum or no maintenance thereon over long periods of time for economically inspecting all cases to insure that they are filled 100 percent with bottles; and to provide means for indicating, rapidly and directly, the presence of any missing bottle in a case presumably filled with capped bottles.

The foregoing and other objects and advantages of the invention will be made more apparent as the specification proceeds.

In order to understand the present invention completely, reference is made to the accompanying drawings, wherein.

When referring to corresponding members shown on the drawings and referred to in the specification, corresponding numerals are used to facilitate comparison therebetween.

Broadly, the present invention, as one embodiment thereof, comprises control apparatus for use in detecting any missing capped bottles in any longitudinally extending row of bottles in cases as moved through a fixed path and it includes a light beam source, photoelectric means positioned opposed to the light beam source to be deactuated by cases as moved past a point in the fixed path, a relay for controlling drive of the cases through their fixed path, means for actuating the relay to start drive of the cases and for locking the relay in conductive position, a sensitivity control for each row of bottles being inspected and each including an individual senser head positioned above a row of bottles in a case, the senser heads being actuated continuous by the metal caps on properly positioned bottles in the rows as moved thereby, a relay switch for each of the sensitivity controls with its actuating coil connected to the sensitivity control to be actuated thereby and with its switch being normally open and connected in the power supply for the relay to open it if the sensor head is not actuated, and photoelectric scanner means connected to the photoelectric means to receive the output therefrom and including a second relay switch connected in parallel to the switch of the first relay switch and normally closed by being opened by the photoelectric means when de-energized whereby the relay is opened and drive of cases is stopped when any bottle cap is missing in the field of any sensor head.

Primary components

Figure 1:
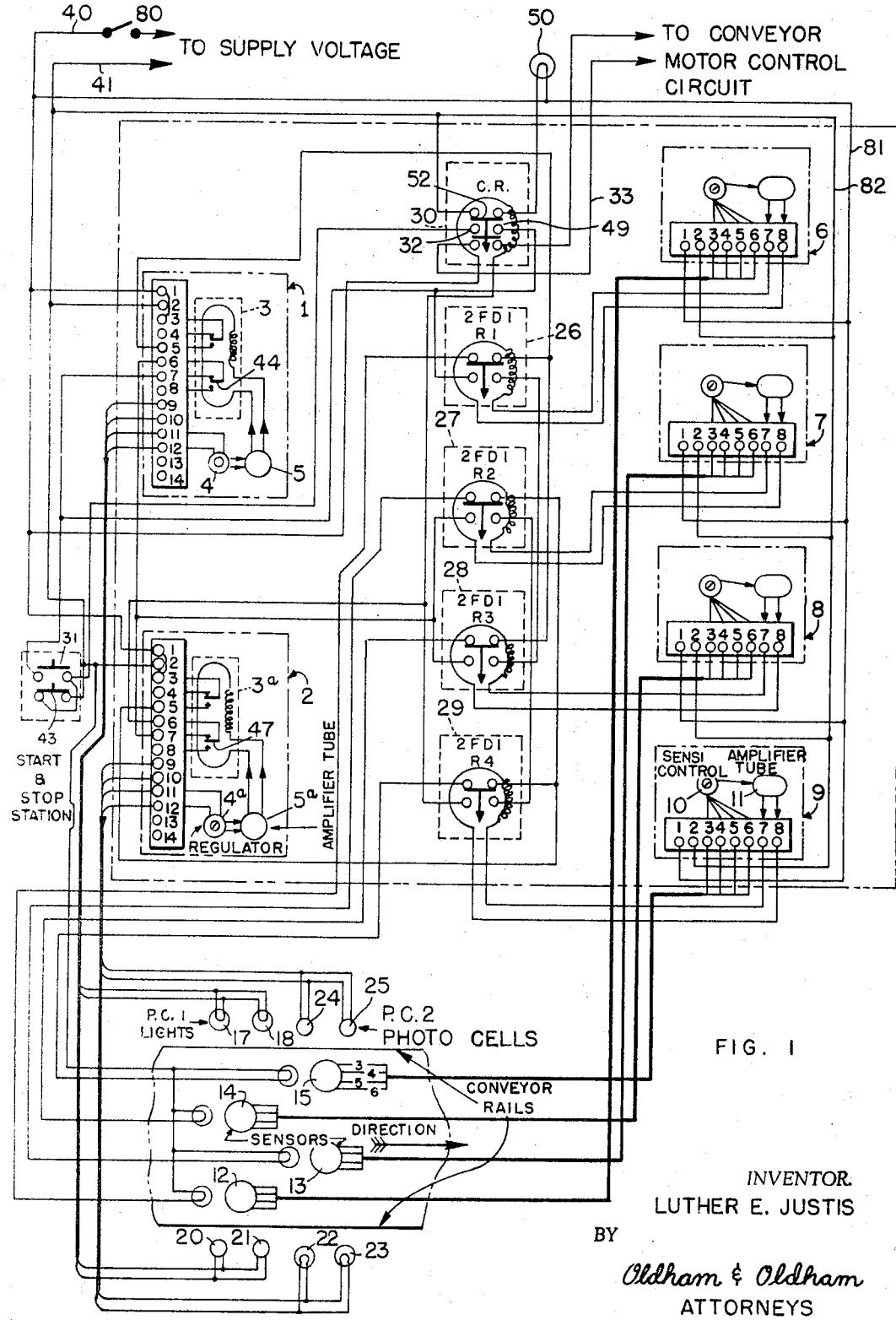
FIG. 1 is a circuit diagram of electrical control means used in the practice of the invention shown in association with other apparatus, shown diagrammatically, used in practice of the invention.

Attention now is directed to the details of the structure shown in the accompanying drawings, and the principal components of the circuit and associated means shown in FIG. 1 include a pair of photoelectric means, or scanner systems indicated by the numerals 1 and 2, which are of a conventional construction and may, for example, be a Farmer Electric Products Co., Inc. type PE-3. These photoelectric means or photoelectric scanner systems each include a suitable relay 3 or 3a, a regulator 4 or 4a and an amplifier tube 5 or 5a connected between the regulator and the actuating coil for the relay 3. Other primary components of the control circuit and means of the invention include a sensitivity control 6, one of which is required for each row of capped bottles to be inspected by the apparatus. In this instance, four longitudinally extending rows of bottles are to be checked by the apparatus of the invention whereby sensitivity amplifiers or controls 6, 7, 8 and 9 are shown in the drawings. Each of these sensitivity controls may comprise an 42FC1 proximity switch amplifier such as is made by the Microswitch Division of the Minneapolis-Honeywell Regulator Company, and each sensitivity control includes a sensitivity control member 10 electrically coupled to an amplifier tube 11. As will be explained hereinafter in more detail, each of the sensitivity amplifiers 6 through 9 is electrically connected to an individual 42FC1 proximity switch 12, 13, 14 and 15, respectively. These proximity switches 12, made by the same company as the amplifiers, are positioned directly over and in alignment with the individual rows of bottles to be inspected and are fixedly located whereby the bottles can be rapidly moved thereunder in filled cases as processed in accordance with present commercial practice. Each of these proximity switches 12, or sensor heads, is a temperature compensated, balanced inductance bridge. When a ferromagnetic object is placed within the detection range of the sensor, it reduces the reluctance in the flux path linking the two active coils present in the bridge so as to unbalance the bridge and produce a voltage output. Such voltage output is used, as hereinafter explained, for desired control actions. The sensor head action and field of survey can be adjusted by design of the head and/or in the sensitivity control to which it connects.

Figure 2:
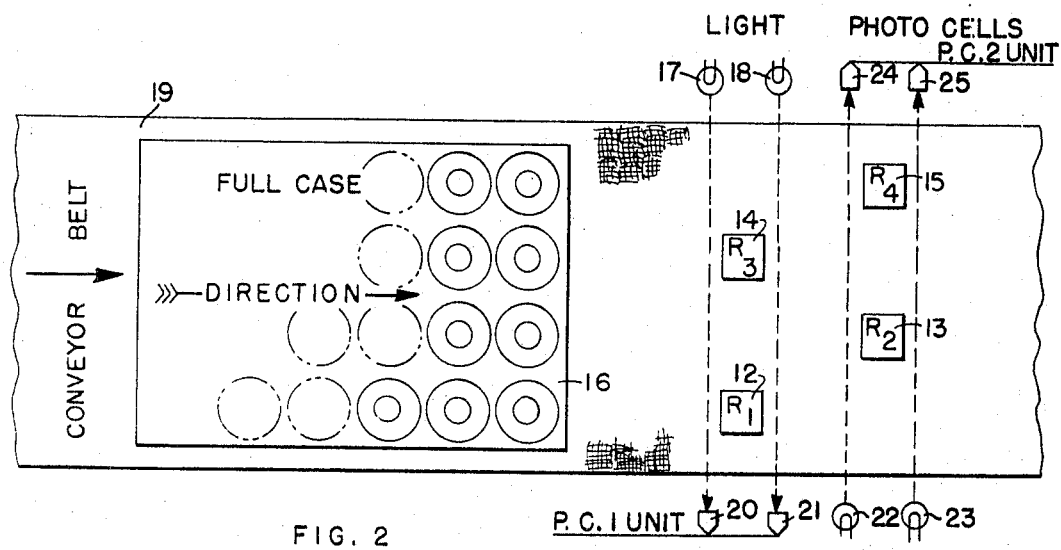
FIG. 2 is a diagrammatic plan view of the apparatus and control means of the invention in one simplified form thereof.

FIG. 2 of the drawings clearly shows the association of the individual proximity switches, or sensor heads 12, 13, 14 and 15 in the apparatus whereby each one if these proximity switches is adapted to have a case 16 having four longitudinally extending rows of bottles therein moved under the proximity switches, one of which is aligned with each of the longitudinally extending rows in the filled case 16.

Figure 3:
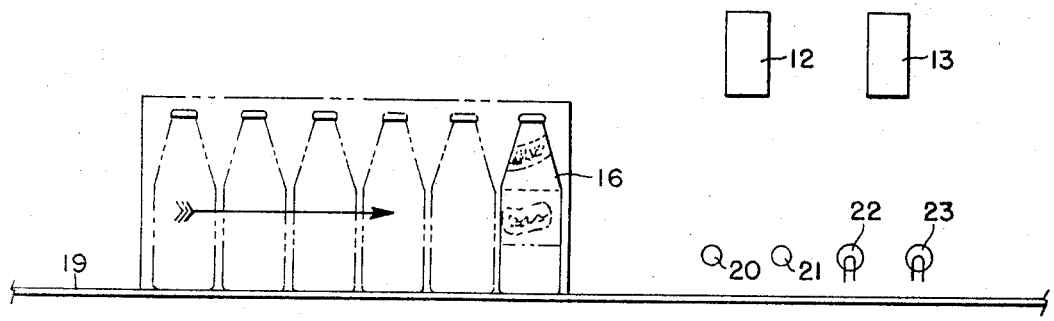
FIG. 3 is a side elevation, shown diagrammatically, of the apparatus of FIG. 2.

FIGS. 2 and 3 of the drawings show that a pair of lights 17 and 18 are placed on one side of a conveyor belt 19 or other carrier member on which the case is positioned, and which belt is driven by conventional means so as to move the case and the bottles therein through a fixed longitudinal path. The lights 17 and 18 are adapted to direct a beam transversely across the belt 19 and are spaced longitudinally from each other while a pair of photocells 20 and 21 are shown fixedly positioned directly across the conveyor belt 19 from the lights 17 and 18 with the vertical positioning of these members being such that the case 16 will first intercept the beam from the light 17 as the case is moved longitudinally and then will intercept the light beam from the light 18 as the case progresses further with the conveyor. A second pair of lights 22 and 23 are positioned longitudinally downstream from the lights 17 and 18 and are on the opposite side of the conveyor for directing light beams transversely of the conveyor to actuate a pair of photocells 24 and 25 positioned on the opposite side of the conveyor and likewise to have the light beams from the lights 22 and 23 progressively interrupted by the case as it is moved through its path to prevent the light beams from reaching the photocells 24 and 25.

The apparatus of the invention also includes, as primary components thereof, four relays 26, 27, 28 and 29 (FIG. 1) which are individually connected to and are controlled by the sensitivity amplifiers 6, 7, 8 and 9, respectively. A control relay 30 is also present and it is adapted to be actuated by the closing of a start button or switch 31, which control relay 30, when actuated, closes contacts or a switch 32 in a lead 33 that connects to the control circuit for the motor or other suitable means that is used for driving the conveyor or belt 19 whereby drive of such conveyor is controlled by this control relay and, when predetermined conditions exist, the drive of the belt is stopped, as when a missing bottle is detected by the apparatus of the invention.

*Simplified wiring diagram*

Figure 4:
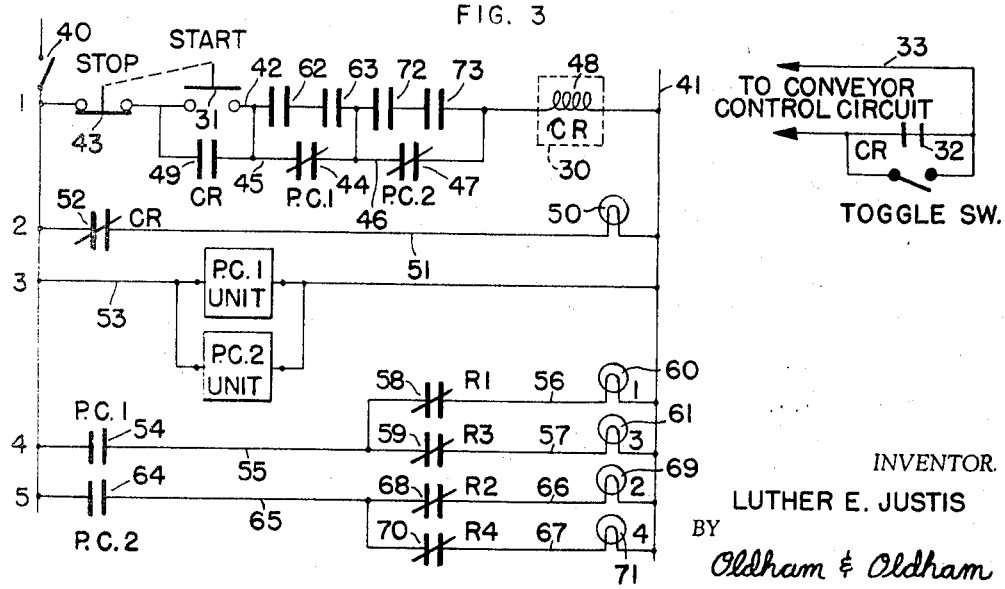
FIG. 4 is a simplified diagrammatic view of the wiring diagram of FIG. 1.

FIG. 4 shows a simplified diagram corresponding to the detailed circuitry of FIG. 1 and in FIG. 4, a pair of power leads 40 and 41 are shown, which leads can, for example, be connected to the secondary of a transformer, the primary of which is connected to a conventional 110 volt power source whereby any desired control voltage can be supplied to the leads 40 and 41. To start the conveyor or belt 19, a start button or switch 31 is closed in a lead 42 that connects between the power supply leads. Power is transmitted through the normally closed stop button 43, the normally open start button 31, and through a normally closed switch 44, controlled by the photocell unit 1, in a lead 45 that is connected in parallel with a portion of the power lead 42 and then through a second power lead 46 that is connected in parallel with another portion of the power lead 42 and has a normally closed switch 47 controlled by the photocell unit 2 therein. An actuating coil 48 for the control relay 30 is connected in the power lead 42 and hence such relay is actuated by the temporary closing of the start button or switch 31. Such relay 30 closes the switch 32 in the control lead 33 for the belt drive circuit, and it also closes a switch 49 that is connected in shunt around the start button or switch 31 so as to lock such control relay in actuated, or closed position.

Usually it is preferable to have some type of a visual indicating means provided on the case packing apparatus such as that which the present invention is used to show when it is not in operable condition. Thus, an indicator light 50 is provided in a lead 51 that connects between the power leads 40 and 41. When this indicator light 50 is used in the apparatus, then the control relay 30 also controls a normally closed switch 52 provided in the lead 51 to extinguish the light 50 when the case packer apparatus is actuated and is in suitable operation or in condition for operation.

FIG. 4 shows how the photoelectric means 1 and 2 normally are connected in parallel by a lead 53 or branches thereof that connect them across the power supply leads 40 and 41 so that such means can be actuated or deactuated individually for control action thereby.

Each of the photoelectric means 1 and 2 is adapted to remain in the normal position shown in FIGS. 1 and 4 for the contact means controlled thereby until both photocells 20 and 21 or 24 and 25 associated with such photoelectric means are darkened. FIG. 4 shows that a normally open switch 54, controlled by the photoelectric means 1, is provided in a lead 55 that connects to the power supply lead 40 and which connects to the power lead 41 by two parallel leads 56 and 57. Hence the switch 54 is closed only when both of the photoelectric cells associated with the photoelectric means 1 are darkened and current will only flow through either the lead 56 or 57 if a normally closed switch 58 or 59 in such parallel leads, respectively, is still closed. These normally closed switches connect to suitable means, such as indicator lights 60 and 61, respectively, to show where trouble is existing in the cases being inspected or where a missing bottle is located. That is, the relay 26, when actuated by a bottle cap being present in the field of sensor head 12, will open the switch 58 and will prevent the light 60 from being lit when a bottle is properly positioned in the row being inspected, and likewise, the switch 59 controlled by the relay 28 will be opened when a bottle cap is properly positioned in the field being examined by such relay and associated sensor head.

FIG. 4 shows that when the case 16 passes in front of the lights 17 and 18 so as to deactuate the photocells 20 and 21 of the photoelectric cell means 1, then switches 62 and 63 in lead 42 will be closed and these switches are in parallel with the normally closed switch 44 controlled by the photoelectric cell means 1 whereby the control relay 30 will remain actuated, and yet the indicator lights 60 and 61 of the apparatus will be deactuated when the apparatus is properly functioning and the desired number of metallic caps of bottles are in the field sensed by the sensor heads 12 and 14, respectively.

The photoelectric cell means 2 likewise controls the normally open switch 64 provided in a power line or lead 65 which connects to the power supply lead 40. The lead 65 connects to the opposite power supply lead 41 by a pair of parallel leads 66 and 67, respectively, in a manner similar to that means used in the lead 55. Thus, the lead 66 has a normally closed switch 68 therein and an indicator light 69 to indicate any trouble sensed by the sensor head 13. The corresponding lead 67 has a normally closed switch 70 in it together with an indicator light 71. It also will be noted that switches 72 and 73, which are normally open, are also provided in the power lead 42 in parallel with the normally closed switch 47 controlled by the photoelectric cell means 2 whereby when such photoelectric cell means is darkened and the relay means 27 and 29 are properly actuated, then the switches 72 and 73 are closed and the control relay 30 will remain actuated.

From this simplified operational diagram shown in FIG. 4, it is seen that when both photoelectric cell means 1 and 2 are de-energized by the case 16 moving therebetween, then the continued drive for the means controlling action of the conveyor 19 are controlled by the sensor heads 12, 13, 14 and 15. Each of these heads is so adjusted that it must have a properly positioned capped bottle located in the case in the electromagnetic field surveyed by the individual sensor head means to provide the required output voltage to maintain the circuit operable. When any one of these sensor heads is de-energized by no bottle cap present within the space being surveyed, then one of the control relays 26 through 29 will be de-energized with one of the switches 62, 63, 72 or 73 being opened and drive for the conveyor will be terminated while one of the switches 58, 59, 68 or 70 will be closed and the proper indicator light 60, 61, 69 or 71 will be lit to show exactly where the sensor head has detected a missing bottle. The operator of the apparatus then can easily correct the deficiency in the case being inspected and the apparatus can then readily be started and further bottles be inspected automatically by the apparatus.

In the circuitry as shown, the photoelectric scanner means 1 and 2 are shown in their normal energized positions when light from the light sources provided is contacting at least one of the photocells connected to each of the photoelectric scanner units. By providing two photocells in association with each scanner unit, it insures that the case has moved far enough along the conveyor that the inspection of the case can be performed by the sensor devices provided in the apparatus, and the location of the sensor heads in relation to bottles positioned in the case being inspected. Usually the cases have nests therein to receive and position the bottles. By providing two sets of longitudinally and transversely spaced sensor heads in the apparatus, any possible interference or overlapping between the fields of these sensor heads is avoided.

In the drawings, the relays 3 shown in the photoelectric scanner means 1 and 2 both are shown in their normal energized positions when a voltage output is produced in the photocell means by no case being present in the apparatus being controlled by the means of the invention.

*Detailed circuit*

FIG. 1 shows more details of the wiring circuit used in connecting the various components of the apparatus of the invention referred to hereinbefore. It is believed that it is not necessary to describe all of the individual connectors and leads used in connecting the various members of the control apparatus of the invention. Likewise, all of the internal circuitry and connections of the various conventional components of the apparatus are not shown completely in these diagrams as standard commercial units are used in the photoelectric scanner means and in the sensitivity controls as well as the actual sensor heads present in the apparatus. Thus, for clarity, details of these connections are not shown. FIG. 1 shows that the control apparatus of the invention can be actuated by closing a switch 80 which closes the power supply circuit formed by the leads 40 and 41 and at that time electrical energy is transmitted to both of the photoelectric scanner means 1 and 2 and from such units electrical energy is transmitted to the lights 17, 18, 22 and 23 and to the associated photoelectric cells on which light beams are directed. Thereafter, then the start button 31 can be closed at any desired time and the apparatus will operate until either the stop button 43 is pushed, or when the entire control apparatus is deactuated by opening the switch 80, or when a missing bottle is detected.

The action of the relays 3 and 3a in the photoelectric scanner means are shown to control the switches 44 and 47 in these units, and the details of the circuits of the control relay 30 are indicated in detail in FIG. 1.

The connections of the individual sensitivity controls 6, 7, 8 and 9 both internally and to the individual sensor heads connected thereto for control of the sensitivity control, likewise are indicated substantially diagrammatically with the four leads connecting from each sensitivity control to the individual sensor head associated therewith being shown as a common connecting lead but actually comprising four individual leads for completing connections between the sensor head and the amplifier or sensitivity control unit associated therewith.

Each amplifier unit or sensitivity control 6, 7, 8 and 9 connects to the actuating coils for the individual relays 26, 27, 28 and 29 to control the contacts and/or switches as indicated in the relays to perform the individual control operations explained in detail in relation to FIG. 4.

Power is supplied to the individual sensitivity controls by leads 81 and 82 connecting to the power leads 40 and 41.

It is believed that the operation of the control apparatus of the invention is clear from the description set forth hereinabove. These control members are all relatively conventional, but have been combined in a novel and improved manner for effecting rapid and efficient scanning or inspecting of rows or a row of bottles as moved by a fixed point to determine if all of these bottles are capped and with the metallic caps being present in predetermined longitudinally spaced relationship to each other to maintain the control apparatus actuated and permit continued operation of the drive means used to move the filled bottle past an inspection point. The apparatus gives an immediate indication where trouble exists in a case being inspected. The apparatus will function efficiently over a long service life with a minimum of maintenance thereon. The control apparatus of the invention can be readily applied to existing conveyor lines for inspecting filled cases being moved therealong. Thus, it is believed that the objects of the invention has been achieved.

While one complete embodiment of the invention has been disclosed herein, it will be appreciated that modification of this particular embodiment of the invention may be resorted to without departing from the scope of the invention as defined in the appended claims.

What is claimed is:

1. Control apparatus for use in detecting any missing capped bottles in any longitudinally extending row of bottles in cases as moved at controlled speed through a fixed path and comprising a light beam source, photocell means positioned opposed to said light beam source to be deactuated by cases as moved past a point in said fixed path, a relay for controlling a switch which when closed starts drive of said cases through said fixed path, means for actuating said relay to start drive of said cases through said fixed path and for locking said relay in conductive position, a sensitivity control for each row of bottles being inspected and each including an individual sensor head positioned above and adjacent a row of bottles in a said case, said sensor heads being magnetically controlled and being actuated continuously by the metal caps on properly positioned bottles in said row as moved thereby, a relay switch for each of said sensitivity controls with its actuating coil connected to said sensitivity control to be actuated thereby and with its switch being normally open and connected in the power supply to the actuating coil for said relay to open power supply thereto if said sensor head is not actuated, and photoelectric scanner means connected to said photocell means to receive the output therefrom and including a second relay switch connected in parallel to the switch of said first relay switch and normally closed but being opened by said photoelectric means when deenergized whereby said relay is opened and drive of cases is stopped when any bottle cap is missing in the field of said sensor head.

2. Control apparatus for use in detecting any missing metal caps on bottles in any longitudinally extending row of bottles in cases as moved through a fixed path and comprising a control circuit to regulate said driven means, and driven means for moving said cases through said fixed path, means for sensing the presence of cases to be inspected moving in said fixed path and connected to said control circuit to energize it for control action;

said control circuit including a sensitivity control for each row of bottles being inspected and each such sensitivity control including an individual sensor head positioned above a row of bottles in a said case, said sensor heads being magnetically controlled and being adjustable as to the field inspected thereby, and means operated by each of said sensitivity controls and so connected in said control circuit to terminate drive of cases through said fixed path if any said sensor head does not sense one or more bottle caps in its operative field when said control circuit is energized.

3. Control apparatus for use in detecting any missing bottles, or any uncapped bottles, in a longitudinally extending row of capped bottles in filled cases as moved through a fixed path and where drive means are present to move cases along the fixed path, and comprising a pair of adjacent but spaced parallel light beam sources directing light beams across a portion of said fixed path, a pair of photoelectric means positioned opposed to said light beam sources to be deactuated by cases as moved past said portion of said fixed path, a main relay for controlling a switch which when closed maintains drive of said cases through said fixed path, means for actuating said main relay and starting drive of said drive means to move said cases through said fixed path, said relay being locked in conductive position by such actuation, a sensor head positioned in said portion of said fixed path above each of a pair of transversely spaced rows of bottles in a said case, said sensor heads being magnetically controlled and having limited areas of sensitivity to be actuated continuously by the metal caps on properly positioned capped bottles in said rows as moved thereby, a relay actuated switch for each of said pair of sensor heads connected in series with its actuating coil connected to a respective said sensor head to be actuated thereby and with its switch being normally open but being closed by actuation of its said sensor head and connected in the power supply to the actuating coil for said main relay to open the power supply thereto if a said sensor head is not actuated, and a second relay actuated switch for each of said photoelectric means connected in parallel to the switches of said first relay switches and being normally closed but being opened by said photoelectric means when deenergized by a properly positioned case for inspection whereby said sensor heads control said main relay when a case deactuates said photoelectric means and whereby said main relay is opened and drive of cases is stopped when any bottle or bottle cap is missing in the field of a said sensor head.

4. Control apparatus as in claim 3 and including a second pair of adjacent but spaced parallel light beam sources directing light beams across a second portion of said fixed path longitudinally spaced from said first portion but within the length of a case of bottles, a second pair of photoelectric means positioned opposed to said light beam sources to be deactuated by cases as moved past said second portion of said fixed path, a sensor head positioned in said second portion of said fixed path above each of another pair of transversely spaced rows of bottles in a said case, and relay actuated switches connected to said second pair of sensor heads and photoelectric means as in claim 3.

5. Control apparatus for use in detecting any missing capped bottles in any longitudinally extending row of bottles in cases as moved through a fixed path and comprising a pair of light beam sources positioned at longitudinally spaced portions of said fixed path slightly more than a bottle width apart, a pair of photoelectric means positioned opposed to said light beam sources to receive said beams normally and to change condition when a case is moved in said fixed path to interrupt said beams, a relay for controlling a switch which when closed maintains drive of said cases through said fixed path, means for actuating said relay and for starting drive of said cases through said fixed path, said relay being locked in conductive position by actuation of said means, a sensitivity control for transversely spaced rows of bottles being inspected and each including an individual sensor head positioned above such rows of bottles in a said case and longitudinally between said light beam sources, said sensor heads being magnetically controlled and being actuated continuously by the metal caps on properly positioned capped bottles in said row as moved thereby, a relay actuated switch for each of said sensitivity controls with its actuating coil connected to said sensitivity control to be actuated and closed thereby when a metal cap is in the field of the sensor head therefor and with its switch being normally open and connected in the power supply to the actuating coil for said relay to open power supply thereto if said sensor head is not actuated, photoelectric scanner means connected to said photoelectric means to receive the output therefrom and including a second switch associated with a said relay actuated relay switch and being normally closed but being opened by said photoelectric scanner means when deenergized, and indicator means for each row of bottles operatively connected to said second switches to be actuated when any said sensor head is not actuated to indicate a missing bottle and/or bottle cap.

6. Control apparatus for use in detecting any missing metal caps on bottles or missing capped bottles in any longitudinally extending row of bottles in cases as moved through a fixed path and comprising a control circuit to regulate said driven means, and driven means for moving said cases through said fixed path, means for sensing the presence of cases to be inspected moving in said fixed path and connected to said control circuit to energize it for control action;

said control circuit including a sensitivity control for each row of bottles being inspected and each such sensitivity control including an individual sensor head positioned above a row of bottles in a said case, said sensor heads being magnetically controlled and being adjustable as to the fields inspected thereby, and means operated by each of said sensitivity controls and so connected in said control circuit to terminate drive of cases through said fixed path if any said sensor head does not sense one or more bottle caps in its operative field when said control circuit is energized, said control circuit including at least one normally closed switch therein connected to said sensing means to be opened thereby when said control circuit is energized, and said last-named means includes a normally open switch in parallel with said normally closed switch to be closed when a case is sensed by said first-named means and a cap is sensed by said sensor head.

References Cited

UNITED STATES PATENTS

| | | | |
|---|---|---|---|
| 2,351,888 | 6/1944 | Stewart | 53—78 X |
| 2,472,945 | 6/1949 | Gingrich. | |
| 2,791,730 | 5/1957 | Stout. | |
| 2,982,862 | 5/1961 | Smith. | |
| 3,092,941 | 6/1963 | Baker et al. | 53—78 X |
| 3,094,214 | 6/1963 | Wyman et al. | |
| 3,302,103 | 1/1967 | Ochs | 53—78 X |

RALPH G. NILSON, *Primary Examiner.*

M. A. LEAVITT, *Assistant Examiner.*

U.S. Cl. X.R.

53—78; 209—111.7, 111.8